Aug. 3, 1954     J. F. BLOCKER ET AL     2,685,468
REMOVABLE TRAILER HITCH
Filed March 12, 1952
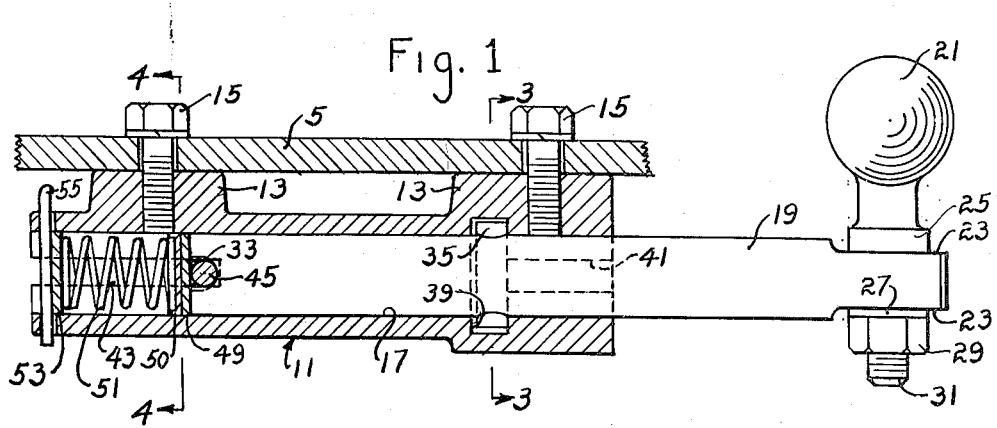
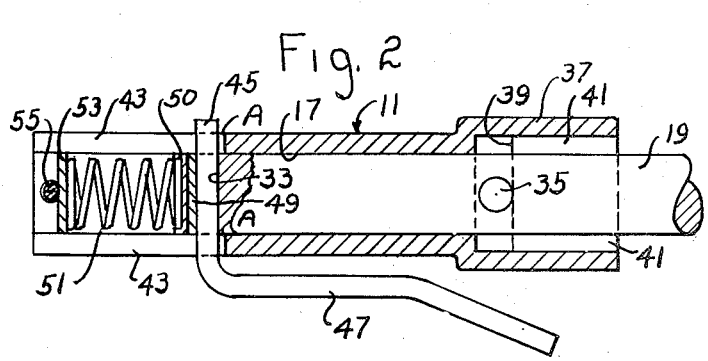 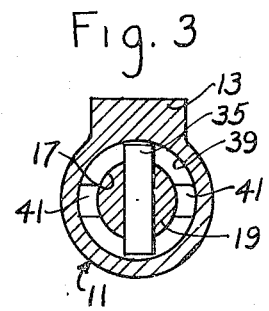
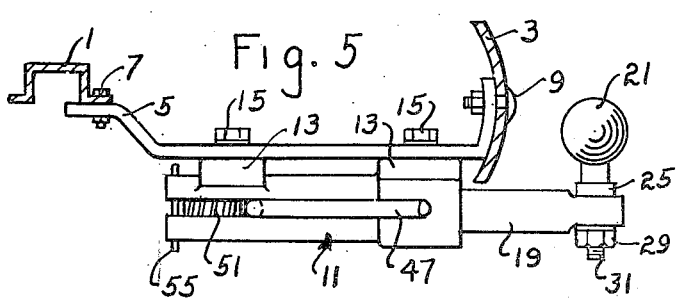 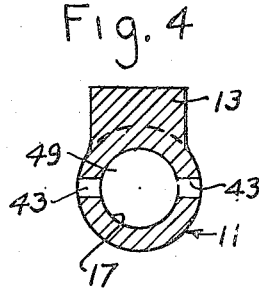
JOHN FRED BLOCKER
WILLIAM E. SCHOBY
*INVENTOR.*
BY Edmund W. E. Kamm
*ATTORNEY*

Patented Aug. 3, 1954

2,685,468

UNITED STATES PATENT OFFICE 2,685,468

REMOVABLE TRAILER HITCH

John Fred Blocker, Laketon, and William E. Schoby, Wabash, Ind.

Application March 12, 1952, Serial No. 276,184

8 Claims. (Cl. 287—103)

This invention relates to a removable trailer hitch. More specifically it relates to a trailer hitch which has one piece permanently attached to the car in such a way that it does not project outwardly beyond the bumper while a second piece which carries the hitching ball is removably mounted therein and projects beyond the bumper far enough to receive the mating socket which is attached to the trailer.

It is an object of this invention to provide a mechanism of the type described which will not be unsightly and which will not constitute a hazard to persons walking around the rear of the car when the trailer is not attached.

Another object is to provide a hitch of the type described which can be quickly and easily attached and detached without tools.

It is another object of the invention to provide a hitch which will be positively engaged in the support and which will be latched in the engaged position.

A further object of the invention is to provide a trailer hitch which is rugged and sturdy.

Yet a further object of the invention is to provide means for holding the ball in vertical position.

These and other objects will become apparent from a study of this specification and the drawings which are attached hereto, made a part hereof and in which:

Figure 1 is a vertical elevation of the device in the assembled condition with parts shown in section.

Figure 2 is a plan view of the device in the assembled condition with parts shown in section.

Figure 3 is a view taken substantially on line 3—3 of Figure 1 showing the means for locking the removable member against axial withdrawal.

Figure 4 is a sectional view taken substantially on the line 4—4 of Figure 1 showing the spring chamber.

Figure 5 is an elevation of the device in assembled relation showing the means for attaching it to a car.

Referring now to the drawings, the numeral 1 represents a cross-member of a motor car and 3 the bumper which is attached to the car by suitable means, not shown.

A flat bar 5, suitably bent, is attached at one end to the cross-member 1 by a bolt 7 and its other end to the bumper by the bolt 9.

Mounted on the bar 5 is the receiving member or socket of the device indicated generally by the numeral 11 which has a pair of lugs 13 which abut the bar and receive the screws 15 to hold it in place on the bar.

The socket is provided with a horizontal, central bore 17 of sufficient size to slidably and rotatably receive the round bar 19, on one end of which is mounted the ball part 21 of the hitch. The ball receiving end of the bar is preferably provided with opposed flat surfaces 23 against which the shoulder 25 and lock washer 27 respectively, rest. A nut 29 mounted on the threaded shank 31 of the ball to hold it in place on the bar.

The other end of the bar is grooved transversely at 33. The groove extends in a direction perpendicular to the shank 31.

Intermediate the ends of the bar a pin 35 is passed diametrically through and is fixed therein. The pin extends parallel to the axis of the shank 31.

One end of the socket member is preferably enlarged at 37 and is provided with an undercut or annular groove 39 spaced from the end of the socket, which groove extends radially outwardly from the bore 17. Two diametrically opposed, axially directed grooves 41 extend from the outer end of the member and intersect the annular groove. The axes of these grooves are disposed in a common horizontal plane which preferably includes the longitudinal axis of the bore 17.

Both the axial grooves and the annular groove have a depth sufficient to clear the ends of the pin 35 so that the bar may be moved longitudinally in the bore 17 with the ends of the pin in the grooves 41 until they strike the far wall of the groove 39 whereupon the bar may be rotated to dispose the ends of the pin between the walls forming the groove 39 to prevent substantial axial movement of the bar in either direction in a manner similar to a bayonette joint.

The other end of the socket member is provided with diametrically opposed parallel slots 43 which extend entirely through the walls of the member parallel to the axis of bore 17. The slots terminate slightly farther from the end of the member than the position occupied by the end groove 33 in the bar 19 when the pin 35 rests against the right hand wall of annular groove 39. Thus there is some clearance at the points A (Fig. 2) between these slots 43 and the locking shaft 45 which rides in the slots and in the groove.

One end of the shaft is bent parallel to the member 11 and then outwardly to form a lever 47 for rotating the shaft.

A circular disc or fulcrum 49 is fixed to the shaft within the bore 17 and is disposed immediately adjacent the end of shaft 19.

A spring 51 is confined between the spring seat 50 which rides on disc 49 and a plug 53 which

Operation

Assume that the two parts are disconnected and it is desired to assemble them. With the lever 47 in the position shown in Figure 5 the bar is entered in the bore 17, and the pin 35 is entered in the grooves 41. In this condition the shank 31 is horizontal and the groove 33 is perpendicular to the shaft 45.

By ramming the bar against the shaft 45 and at the same time applying a slight torque in a direction to move the ball 21 toward the vertical position, the bar 19 moves the shaft 45 toward the left (Figure 1) compressing the spring 51. The torque applied to the bar hooks the pin 35 behind the wall of groove 39 as soon as the pin 35 clears the ends of grooves 41. Thereafter, further rotation of the bar 19 to raise the ball to the vertical position brings the end groove 33 of the bar parallel with shaft 45 and spring 51 forces the shaft 45 into the groove 33. This latches the bar against further rotation and the device is ready for use since it now occupies the Figure 5 position.

To remove the bar, the lever 47 is actuated in either direction to rotate shaft 45. This causes one side of the disc 49 to engage the end of bar 19, if it does not already do so, and further movement of the parts about the rim of the disc as a fulcrum causes the shaft 45 to move to the left (Figure 2) along the slots 43 so that the shaft will be withdrawn from the end groove 33. The bar can then be rotated to align the pin 35 with grooves 41 whereupon the spring 51 will tend to eject the shaft from the bore 17. In any case it can then be withdrawn from the socket. The disc, shaft and lever will tend to be returned to the Figure 5 position and if they are not, they should be manually returned.

As this occurs, the spring 51 forces the shaft back to the ends of slots 43 and tends to return the lever to the Figure 5 position.

It is obvious that various changes may be made in the form, structure and arrangement of parts without departing from the spirit of the invention. Accordingly, applicants do not desire to be limited to the specific embodiment disclosed herein primarily for purposes of illustration; but instead, they desire protection falling fairly within the scope of the appended claims.

What we claim to be new and desire to protect by Letters Patent of the United States is:

1. In a detachable trailer hitch, the combination of a receptacle having a longitudinal bore provided with an annular groove disposed adjacent one end of the bore and a longitudinal groove connecting said end with said annular groove, a pair of longitudinal slots disposed in the other end of said receptacle, a shaft mounted in said slots, means for urging said shaft toward said annular groove, a bar rotatably and slidably mounted in said bore, a projection on said bar being of smaller size than said grooves and adapted to extend into said grooves whereby one wall of said annular groove will limit the inward sliding motion of the bar and whereby rotation will dispose the projection behind the other wall of the annular groove to prevent withdrawal of the bar, and a groove formed in the inner end of said bar for the reception of the shaft whereby rotation of the bar from a position wherein the shaft is located in the end groove is prevented, said shaft and end groove being out of alignment when the projection is aligned with the longitudinal groove.

2. In a detachable trailer hitch, the combination of a receptacle having a longitudinal bore provided with an annular groove disposed adjacent one end of the bore and a longitudinal groove connecting said end with said annular groove, a pair of longitudinal slots disposed in the other end of said receptacle, a shaft mounted in said slots, means for urging said shaft toward said annular groove, a bar rotatably and slidably mounted in said bore, a projection on said bar being of smaller size than said grooves and adapted to extend into said grooves whereby one wall of said annular groove will limit the inward sliding motion of the bar and whereby rotation will dispose the projection behind the other wall of the annular groove to prevent withdrawal of the bar, a groove formed in the inner end of said bar receiving the shaft whereby rotation of the bar from a position wherein the shaft is located in the end groove is prevented and means for withdrawing said shaft from said end groove comprising means projecting from the shaft for engagement with a portion of the bar upon rotation of the shaft whereby said shaft is moved along the slots and is withdrawn from the end groove of the bar.

3. In a detachable trailer hitch, the combination of a receptacle having a longitudinal bore provided with an annular groove disposed adjacent one end of the bore and a longitudinal groove connecting said end with said annular groove, a pair of longitudinal guides disposed in the other end of said receptacle, a shaft mounted in said guides, means urging said shaft toward said annular groove, a bar rotatably and slidably mounted in said bore, a projection on said bar being of smaller size than said grooves and adapted to extend into said grooves whereby one wall of said annular groove will limit the inward sliding motion of the bar and whereby rotation will dispose the projection behind the other wall of the annular groove to prevent withdrawal of the bar, a groove formed in the inner end of said bar receiving the shaft whereby rotation of the bar from a position wherein the shaft is located in the end groove is prevented, means for withdrawing said shaft from said end groove comprising means projecting from the shaft for engagement with the end of the bar upon rotation of the shaft whereby said shaft is withdrawn from the end groove of the bar and means for rotating said shaft.

4. In a trailer hitch a receptacle having a longitudinal bore, a bar slidably and rotatably mounted in the bore, an annular groove in the bore adjacent one end and a longitudinal groove connecting said end and said groove, a projection on the bar being of smaller size than said grooves and adapted to fit said grooves whereby the bar, when longitudinally inserted in the bore and rotated, will be held against withdrawal by contact of the projection with the wall of the annular groove, releasable means for preventing rotation of the bar to align the projection and longitudinal groove, said means comprising a shaft disposed transversely of the bore adjacent the end of the bar for movement toward and away from the bar, a groove in the end of the bar receiving the shaft, means urging said shaft toward said bar for engagement in said end groove when the bar is rotated to align the shaft and the end groove and means operable at will for withdrawing the shaft from the end groove.

5. In a trailer hitch a receptacle having a longitudinal bore, a bar slidably and rotatably mounted in the bore, an annular groove in the bore adjacent one end and a longitudinal groove connecting said end and said groove, a projection on the bar being of smaller size than said grooves and adapted to fit said grooves whereby the bar, when longitudinally inserted in the bore and rotated, will be held against withdrawal by contact of the projection with the wall of the annular groove, releasable means for preventing rotation of the bar to realign the projection and longitudinal groove, said means comprising a shaft disposed transversely of the bore adjacent the end of the bar for movement toward and away from the bar, a groove in the end of the bar receiving the shaft, means urging said shaft toward said bar for engagement in said end groove when the bar is rotated to align the shaft and the end groove and means operable by rotation of the shaft for withdrawing the shaft from the end groove.

6. In a trailer hitch a receptacle having a longitudinal bore, a bar slidably and rotatably mounted in the bore, an annular groove in the bore adjacent one end and a longitudinal groove connecting said end and said groove, a projection on the bar being of smaller size than said grooves and adapted to fit said grooves whereby the bar, when longitudinally inserted in the bore and rotated, will be held against withdrawal by contact of the projection with the wall of the annular groove and releasable means for preventing rotation of the bar to realign the projection and longitudinal groove, said means comprising a shaft disposed transversely of the bore adjacent the end of the bar for movement toward and away from the bar, means operable at will for rotating the shaft, a groove in the end of the bar receiving the shaft, a spring in the end of the receptacle and bearing on the shaft urging it into contact with the end of the bar so that it will enter the end groove when the bar is rotated to align the end groove and the shaft, and cam means fixed to the shaft within the bore for contact with the bar, whereby rotation of the shaft will serve to withdraw the shaft from the end groove.

7. In a trailer hitch a receptacle having a longitudinal bore, a bar slidably and rotatably mounted in the bore, an annular groove in the bore adjacent one end and a longitudinal groove connecting said end and said groove, a projection on the bar being of smaller size than said grooves and adapted to fit said grooves whereby the bar, when longitudinally inserted in the bore and rotated, will be held against withdrawal by contact of the projection with the wall of the annular groove and releasable means for preventing rotation of the bar to align the projection and longitudinal groove, said means comprising a shaft disposed transversely of the bore adjacent the end of the bar for movement toward and away from the bar, means operable at will for rotating the shaft, a groove in the end of the bar receiving the shaft, a spring in the end of the receptacle urging the shaft into contact with the end of the bar so that it will enter the end groove when the bar is rotated to align the end groove and the shaft, and a disc fixed to the shaft within the bore and disposed for contact with the bar, upon rotation of the shaft, to cam the shaft from the end groove.

8. In a trailer hitch a receptacle having a longitudinal bore, a bar slidably and rotatably mounted in the bore, an annular groove in the bore adjacent one end and a longitudinal groove connecting said end and said groove, a projection on the bar being of smaller size than said grooves and adapted to fit said grooves whereby the bar, when longitudinally inserted in the bore and rotated, will be held against withdrawal by contact of the projection with the wall of the annular groove and releasable means for preventing rotation of the bar to align the projection and longitudinal groove, said means comprising a shaft disposed transversely of the bore adjacent the end of the bar for movement toward and away from the bar, means operable at will for rotating the shaft, a groove in the end of the bar receiving the shaft, a spring in the end of the receptacle urging the shaft into contact with the end of the bar so that it will enter the end groove when the bar is rotated to align the end groove and the shaft, and a disc fixed to the shaft on the side adjacent the spring within the bore and disposed for contact with the bar upon rotation of the shaft to cam the shaft from the end groove.

References Cited in the file of this patent

UNITED STATES PATENTS

| Number | Name | Date |
|---|---|---|
| 402,132 | Berry | Apr. 30, 1889 |
| 1,332,898 | Hossie et al. | Mar. 9, 1920 |
| 1,645,428 | Hosmer et al. | Oct. 11, 1927 |
| 2,425,838 | Schultz | Aug. 19, 1947 |
| 2,544,185 | Sargent | Mar. 6, 1951 |
| 2,554,711 | Lowman | May 29, 1951 |
| 2,569,086 | Zenk | Sept. 25, 1951 |
| 2,570,933 | Fobes et al. | Oct. 9, 1951 |

FOREIGN PATENTS

| Number | Country | Date |
|---|---|---|
| 33,046 | France | June 11, 1928 |
|  | (First addition to 621,256) | |
| 106,422 | Great Britain | May 24, 1917 |